US 8,041,370 B2

(12) United States Patent
Pomerantz et al.

(10) Patent No.: US 8,041,370 B2
(45) Date of Patent: *Oct. 18, 2011

(54) METHOD AND APPARATUS FOR LOCATING POSITION OF A MOBILE DEVICE IN AN ASSISTED SATELLITE POSITIONING SYSTEM

(75) Inventors: Scott Pomerantz, Wyckoff, NJ (US); Charles Abraham, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/707,384

(22) Filed: Feb. 17, 2010

(65) Prior Publication Data

US 2010/0151853 A1   Jun. 17, 2010

Related U.S. Application Data

(63) Continuation of application No. 10/926,791, filed on Aug. 26, 2004, now Pat. No. 7,688,260.

(51) Int. Cl.
*H04B 1/16* (2006.01)

(52) U.S. Cl. .................. 455/456.1; 455/457; 455/456.2; 455/456.3; 455/41.2; 342/357.21; 342/357.22; 342/357.27

(58) Field of Classification Search .... 455/456.1–456.6, 455/457, 41.2; 342/351.14, 357.1, 357.06, 342/357.09, 357.21, 357.22, 357.23
See application file for complete search history.

(56) References Cited

U.S. PATENT DOCUMENTS

| 5,479,482 | A  | * | 12/1995 | Grimes ...................... 455/556.1 |
| 6,389,291 | B1 | * | 5/2002 | Pande et al. ................ 455/456.5 |
| 6,453,237 | B1 | * | 9/2002 | Fuchs et al. .................... 701/213 |
| 6,768,450 | B1 | * | 7/2004 | Walters et al. ........... 342/357.09 |
| 2004/0220995 | A1 | * | 11/2004 | Tsutsumi ...................... 709/200 |
| 2005/0153749 | A1 | * | 7/2005 | Falcon et al. .............. 455/569.1 |

* cited by examiner

*Primary Examiner* — Kamran Afshar
*Assistant Examiner* — Dung Lam
(74) *Attorney, Agent, or Firm* — McAndrews, Held & Malloy, Ltd.

(57) ABSTRACT

Method and apparatus for locating position of a mobile device in an assisted satellite positioning system is described. In one example, satellite measurement data is obtained from a plurality of satellites at a mobile device. Position of the mobile device is computed using the satellite measurement data. The position is sent to a cellular device via a wireless ad hoc network. In one example, the wireless ad hoc network comprises a BLUETOOTH communication link. In one example, the mobile device is configured to receive assistance data from a position server through the wireless ad hoc network. For example, the mobile device may comprise a housing configured to plug into a cigarette lighter connector of an automobile and the cellular device may comprise a cellular telephone without location-determination capabilities (i.e., the cellular telephone does not include an integrated GPS receiver).

24 Claims, 4 Drawing Sheets

METHOD AND APPARATUS FOR LOCATING POSITION OF A MOBILE DEVICE IN AN ASSISTED SATELLITE POSITIONING SYSTEM

BACKGROUND OF THE INVENTION

1. Field of the Invention

Embodiments of the present invention generally relate to position location systems. More particularly, the invention relates to a method and apparatus for locating position of a mobile device in an assisted satellite positioning system.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts information regarding the satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time", "satellite time", or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote mobile receiver has become known as "Assisted-GPS" or A-GPS.

However, integrating a GPS receiver into a mobile device such as a cellular telephone increases the cost and complexity of the device (e.g., an integrated GPS receiver may cause the device to consume more power or increase the overall size of the device). In addition, a user may require use an A-GPS system only at certain times, such as while driving a car. When a user does not require use of an A-GPS system, an integrated GPS receiver is superfluous with respect to the primary function of the mobile device.

Therefore, there exists a need in the art for a method and system that locates position of a mobile device in an assisted position location system, where the mobile device does not include an integrated satellite signal receiver.

SUMMARY OF THE INVENTION

Method and apparatus for locating position of a mobile device in an assisted satellite positioning system is described. In one embodiment, satellite measurement data is obtained from a plurality of satellites at a mobile device. Position of the mobile device is computed using the satellite measurement data. The position is sent to a cellular device via a wireless ad hoc network. In one embodiment, the wireless ad hoc network comprises a BLUETOOTH communication link. In one embodiment, the mobile device is configured to receive assistance data from a position server through the wireless ad hoc network. For example, the mobile device may comprise a housing configured to plug into a cigarette lighter connector of an automobile and the cellular device may comprise a cellular telephone without location-determination capabilities (i.e., the cellular telephone does not include an integrated GPS receiver).

In another embodiment, satellite measurement data is obtained from a plurality of satellites at a mobile device. The satellite measurement data is sent from the mobile device to a cellular device via a wireless ad hoc network. The satellite measurement data is sent from the cellular device to a position server via a cellular network. Position of said mobile device is computed at said position server in response to said satellite measurement data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

The present invention includes a system and various methods for locating position of a mobile device. Specifically, an A-GPS mobile device having wireless communication capabilities (e.g., a BLUETOOTH communication interface) communicates with a mobile transceiver that does not have location-enabling capabilities (e.g., a cellular telephone without an integrated satellite signal receiver). The mobile transceiver may use the A-GPS mobile device to obtain position information. The A-GPS mobile device may use the mobile transceiver to communicate with a position server. For purposes of clarity by example, the mobile transceiver is described herein as being a cellular telephone. Those skilled in the art will recognize, however, that the mobile transceiver may also include pagers, laptop computers, personal digital assistants (PDAs), among other mobile devices having wireless communication capabilities.

Generally, a location-enabled mobile device is facilitated by including, in the device, the capability of processing satellite positioning system (SPS) satellite signals, such as Global Positioning System (GPS) signals. Accordingly, the present invention provides a mobile A-GPS device that may be used to provide location-enabling features for users having cellular telephones that do not include location-enabling capabilities.

In one specific embodiment, a mobile A-GPS device is contemplated as being encased in a housing that contains an A-GPS receiver and a wireless transceiver. The housing is adapted to plug into a "cigarette lighter" connector of an automobile. Such cigarette lighter connectors are well known in the art. The A-GPS receiver will receive and process satellite signals from a satellite antenna and will receive assistance data from the wireless transceiver. The wireless transceiver (e.g., a BLUETOOTH transceiver) will communicate with any BLUETOOTH enabled cellular telephone that is proximate the mobile device. Using BLUETOOTH, the mobile A-GPS device requests assistance data via the cellular telephone and may send position information through the cellular telephone to remote locations (e.g., a position server).

Figure 1:
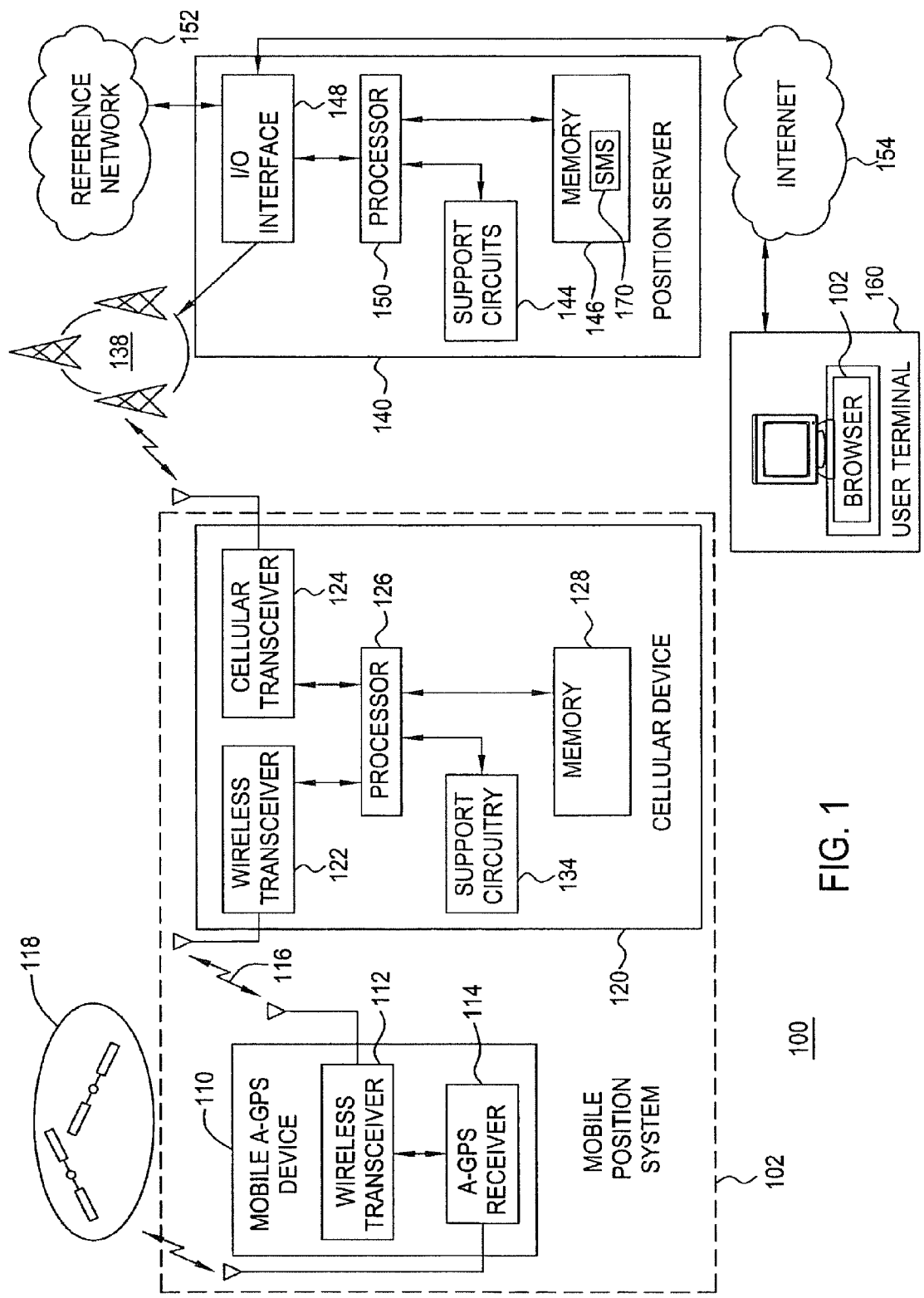
FIG. 1 is a block diagram depicting an exemplary embodiment of a position location system in which the present invention may be utilized.

FIG. 1 is a block diagram depicting an exemplary embodiment of a position location system 100 in which the present invention may be utilized. The position location system 100 comprises an assisted global positioning system (A-GPS) mobile device 110 and a cellular device 120 that collectively form a mobile position system 102. In particular, the mobile position system 102 allows a person having the cellular device 120 (e.g., cellular phone) without location-enabling features to receive position location information from the mobile A-GPS device 110 via wireless communications, such as communications complying with the BLUETOOTH standard.

The cellular device 120 of the mobile position system 102 is capable of communicating with a position server 140 via a wireless communications network 138 (e.g., a cellular communication network). For example, the position server 140 may be disposed in a serving mobile location center (SMLC) of the wireless communication network 138. In one embodiment, the position server 140 stores position information for the mobile A-GPS device 110 that may be accessed over a packet switched network 154 (e.g., intranet and/or Internet) by a user terminal 160 having a browser 162. Accordingly, in one embodiment, a third party entity may locate a person using the mobile A-GPS device 110. In other embodiments, the user of the mobile A-GPS device 110 may obtain position information stored therein.

The A-GPS mobile device 110 comprises A-GPS circuitry 114 and a wireless transceiver 112. The A-GPS circuitry 114 receives satellite signals from satellites 118 using an antenna. The A-GPS circuitry 114 may comprise an A-GPS receiver. An exemplary A-GPS receiver that may be used with the invention is disclosed in commonly-assigned U.S. Pat. No. 6,453,237, issued Sep. 17, 2002, which is incorporated by reference herein in its entirety. The A-GPS circuitry 114 obtains satellite measurement data (e.g., pseudoranges, Doppler measurements) with respect to the plurality of satellites 118. The wireless transceiver 112 receives a wireless signal over a wireless link 116 via an antenna. In one embodiment, the A-GPS mobile device 110 is housed in an adapter having a shape suitable for insertion in a cigarette lighter connector of an automobile. For example, one such adapter shaped mobile A-GPS device is illustratively shown in commonly-assigned U.S. Design Patent Application Ser. No. 29/210,431, filed Jul. 30, 2004, which is incorporated by reference herein in its entirety. It is noted that the mobile A-GPS device 110 may be housed in any shaped structure suitable for facilitating support of the A-GPS circuitry 114 and wireless transceiver circuitry 112, as well as providing the power (e.g., battery power) required to operate the mobile A-GPS device 110.

The cellular device 120 comprises any conventional cellular device, such as a cellular telephone. The cellular device 120 comprises at least one processor 126, as well as memory 128 for storing various control programs. The processor 126 may comprise a microprocessor, instruction-set processor (e.g., a microcontroller), among other types of processing element known in the art. The processor 126 is coupled to memory 128, which may comprise volatile memory (e.g., RAM), non-volatile memory (e.g., disk drives) and/or a combination thereof. The processor 126 cooperates with support circuitry 134, such as power supplies, clock circuits, cache memory, among other conventional support circuitry, to facilitate operation of the cellular device 120 and to assist in executing software routines stored in the memory 128.

Various processes and methods described herein may be implemented using software stored in the memory 128 for execution by the processor 126. Alternatively, the mobile cellular device 120 may implement such processes and methods in hardware or a combination of software and hardware, including any number of processors independently executing various programs and dedicated hardware, such as application specific integrated circuits (ASICs), field programmable gate arrays (FPGAs), and the like.

As shown in FIG. 1, the exemplary cellular device 120 comprises a wireless transceiver 122 and a cellular transceiver 124, both of which are illustratively controlled by the processor 126. In one embodiment, the wireless transceiver 122 comprises a BLUETOOTH transceiver and is configured to send and receive communications with the wireless transceiver 112 (also a BLUETOOTH transceiver) of the mobile A-GPS device 110. It is noted that the wireless transceivers 112 and 122 each have associated antennas to facilitate wireless communications between the mobile A-GPS device 110 and the cellular device 120. For purposes of clarity by example, the present invention is described with respect to BLUETOOTH communications between the A-GPS device 110 and the cellular device 120. It is to be understood, however, that various other wireless communication protocols may also be used, such as IEEE 802.11 (versions a, b, and g) and the like.

As is well known in the art, the BLUETOOTH standard enables at least two portable electronic devices to connect and communicate wirelessly via short-range, ad hoc networks. Under the BLUETOOTH standard, the wireless connections support voice and data, and operate in the Industrial-Scientific-Medical (ISM) band, at selected frequency ranges between 2.4 GHz and 2.5 GHz, depending on the country of use. Since the ISM band is open to anyone, and are subject to numerous sources of interference (e.g., cordless phones, microwaves, garage openers, and the like), BLUETOOTH enabled devices utilize spread spectrum techniques to transfer information over the air. Specifically, the BLUETOOTH standard implements a frequency-hopping spread spectrum technique, which uses a small bandwidth but changes (or hops) frequency after each packet, as opposed to a direct sequence spread spectrum (DSSS) technique, which spreads a transmission across a wide range of frequencies at low power.

In particular, frequency-hop systems divide the frequency band into several hop channels. The channels use a frequency-hop/time-division-duplex (FH/TDD) technique, where each channel is divided in to intervals ("slots"), and a different hop frequency is used for each slot. One packet can be transmitted per interval/slot. Subsequent slot are alternately used for transmitting and receiving, which result in a TDD technique. Two or more units (i.e., radio transceivers) that are within range of each other and share the same channel form a piconet, where one unit acts as a master, controlling traffic on the piconet, and the other units act as slaves. In each slot, a packet can be exchanged between a master unit and one of the slaves. Any unit can become the master. However, the unit that establishes the piconet assumes the master role and controls all traffic on the channel.

When units are not participating in a piconet, they enter standby mode, from which state they periodically listen for page messages. During the listening interval, which lasts for 18 slots (i.e., 11.25 milliseconds), the unit listens on a single wake-up hop carrier and correlates incoming signals with an access code derived from its own identity. If a correlator receiving the incoming signals triggers (i.e., most of the received bits match the access code), the unit activates itself and invokes a connection-setup procedure. Otherwise, the unit returns to sleep until the next wake-up call. Once a slave unit is activated, the slave unit may exchange packetized information may be sent between active units, illustratively over synchronous connection-oriented (SCO) links or asynchronous connectionless (ACL) links. For a detailed understanding of the implementation and operations under the BLUETOOTH standard, the reader is directed to the BLUETOOTH standards (versions 1.1 and 1.2), and the IEEE 802.15 standard, which are incorporated by reference herein in their entireties.

The position server 140 obtains satellite navigation data (e.g., orbit trajectory information, such as ephemeris) for the satellites 118 in view of the mobile A-GPS device 110. The satellite navigation data may be collected by a network of tracking stations ("reference network) 152. The reference network 152 may include several tracking stations that collect satellite navigation data from all the satellites in the constellation, or a few tracking stations, or a single tracking station that only collects satellite navigation data for a particular region of the world. An exemplary system for collecting and distributing orbit information is described in commonly-assigned U.S. Pat. No. 6,411,892, issued Jun. 25, 2002, which is incorporated by reference herein in its entirety. The reference network 152 may provide the collected satellite navigation data to the server 140.

The position server 140 illustratively comprises an input/output (I/O) interface 148, a central processing unit (CPU) 150, support circuits 144, and memory 146. The CPU 150 is coupled to the memory 146 and the support circuits 144. The memory 146 may be random access memory, read only memory, removable storage, hard disc storage, or any combination of such memory devices. The support circuits 144 include conventional cache, power supplies, clock circuits, data registers, and the like to facilitate operation of the server 108. Input/output (I/O) interfaces 148 may be configured to receive satellite navigation data from the reference network 152, communicate with the cellular network 138, and provide for communications over the Internet 154 (e.g., T1/T3 connection, dial-up modem, DSL, and the like).

In one embodiment, the mobile A-GPS device 110 is configured to receive assistance data from the position server 140. In one embodiment, the assistance data comprises acquisition assistance data. The acquisition assistance data may comprise expected pseudoranges or pseudorange models, expected Doppler data, and like type acquisition aiding information known in the art. Exemplary pseudorange models and details of their formation are described in U.S. Pat. No. 6,453,237 referenced above. Acquisition assistance data may be computed by the position server 140 using satellite trajectory data (e.g., ephemeris or other satellite trajectory model) and an approximate position of the mobile position system 102. An approximate position of the mobile position system 102 may be obtained using various position estimation techniques known in the art, including use of transitions between base stations of the wireless communication network 138, use of a last known location of the mobile position system 102, use of a location of a base station of the wireless communication network 138 in communication with the cellular device 120, use of a location of the wireless communication network 138 as identified by a network ID, or use of a location of a cell site of the wireless communication network 138 in which the cellular device 120 is operating as identified by a cell ID.

In another embodiment, the assistance data comprises satellite trajectory data (e.g., ephemeris, Almanac, or some other orbit model). Notably, the satellite trajectory data may comprise a long term satellite trajectory model, as described in commonly-assigned U.S. Pat. No. 6,560,534, issued May 6, 2003, which is incorporated by reference herein in its entirety.

The position location system 100 may be configured in various modes of operation. In one embodiment, the cellular device 120 may request and receive acquisition assistance data from the position server 140. The cellular device 120 sends the acquisition assistance data to the mobile A-GPS device 110, which obtains satellite measurement data. The satellite measurement data is then sent to the server 140 via the cellular device 120 along with a time-tag. The server 140 then locates position of the mobile A-GPS device 110. This configuration is referred to as the mobile station assisted or "MS-assisted" configuration.

In another embodiment, the cellular device 102 may request and receive satellite trajectory data from the position server 140. The cellular device 120 sends the satellite trajectory data to the mobile A-GPS device 110, which obtains satellite measurement data and locates its position. This configuration is referred to as the mobile station based or "MS-based" configuration. In yet another embodiment, the mobile A-GPS device 110 may locate its own position by obtaining ephemeris directly from the satellites 118, rather than from the server 140. That is, the mobile A-GPS device 110 locates its own position without assistance from the server 140. This configuration is referred to as the "autonomous" configuration.

In any configuration, position of the mobile A-GPS device 110 may be located using a navigation model in a well-known manner. Notably, in the general satellite navigation problem, there are nine unknowns:

Three position unknowns: x, y, z;
Three velocity unknowns: $\dot{x}$, $\dot{y}$, $\dot{z}$;
Three clock unknowns: $t_c$, $t_s$, $f_c$;

where x, y, z represent the Cartesian coordinates of the mobile A-GPS device 110, $\dot{x}$, $\dot{y}$, $\dot{z}$ represents the velocities associated with each respective x, y, z coordinate, $t_c$ is the common mode timing error (usually a sub-millisecond value in GPS), $t_s$ is the absolute time tag error, and $f_c$ is the frequency error in a local oscillator within the GPS receiver 114 of the mobile A-GPS device 110. One or more of the variables may be known or estimated based on a-priori information (e.g., $t_s$ may be known if the mobile A-GPS device 110 is calibrated to precise GPS time). One or more of the unknown variables may be solved for using satellite measurement data from the mobile A-GPS device 110 in a well-known manner.

Figure 2:
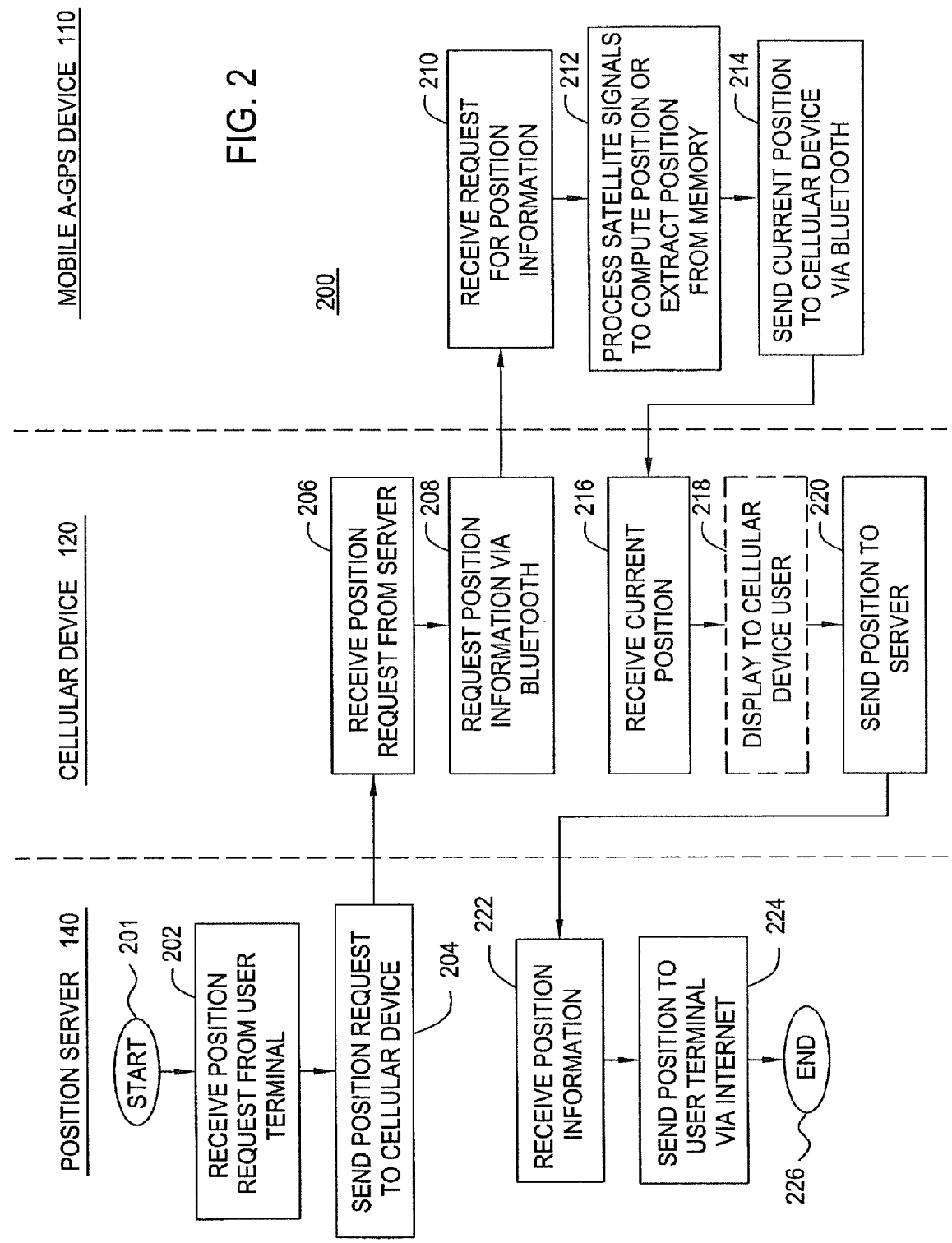
FIG. 2 is a flow diagram depicting an exemplary embodiment of a method for locating position of a mobile device in accordance with the invention.

FIG. 2 is a flow diagram depicting an exemplary embodiment of a method 200 for locating position of a mobile device. Aspects of the method 200 may be understood with simultaneous reference to FIG. 1. FIG. 2 is arranged in three columns, where the first column represents actions associated with the position server 140, the second column represents actions associated with the cellular device 120, and the third column represents actions associated with the mobile A-GPS device 110. In the present embodiment, the position location system 100 is configured in autonomous mode in that the mobile A-GPS receiver 110 locates its own position without assistance from the position location server 140.

The method 200 begins at step 201. At step 202, a position request is received from the user terminal 160 at the position server 140. At step 204, the position server 140 sends the position request to the cellular device 120. In one embodiment, the position request is sent to the cellular device 120 via a short message service (SMS) message. Specifically, an SMS program 170, which is stored in the memory 146 of the server 140, generates the SMS position request message, that enables the transmission of short (alphanumeric) messages between wireless mobile devices. The server 140 transmits the SMS position request over the cellular network 138 to the cellular device 120. It is noted that conventional SMS is characterized by out-of-band packet delivery and low-bandwidth message transfer, which results in a highly efficient means for transmitting short bursts of data. However, one skilled in the art will appreciate that other messaging techniques may be implemented to send position request messages to the cellular device 120 from the server 140, such as messaging techniques that utilize in-band packet delivery, among other techniques.

At step 206, the cellular device 120 receives the position request message from the server 140. At step 208, the cellular device 120 requests position information from the mobile A-GPS device 110. Recall that the cellular device 120 does not have location-enabling features, and must therefore rely on an external source, such as the mobile A-GPS device 110 to provide such position information. Specifically, the wireless transceiver 122 of the cellular device 120 sends a wireless position request message to the wireless transceiver 112 of the mobile A-GPS device 110 via a wireless ad hoc network. In one embodiment, the request message is sent using the BLUETOOTH communications protocol. In this instance, since the cellular device 120 initiates the communications over a specific channel, the cellular device 120 acts as the master unit, while the mobile A-GPS device 110 serves as the slave unit.

At step 210, the mobile A-GPS device 110 receives the request for position information from the cellular device 120. In one embodiment, the mobile A-GPS device 110 processes satellite signals to compute a position. That is, the mobile A-GPS device 110 is configured in an autonomous mode. In another embodiment, the mobile A-GPS device 110 may be configured to periodically compute positions, which are stored in a memory. The mobile A-GPS device 110 may extract the most recently obtained position from the memory in response to the position information request from the cellular device 120. In either case, it is noted that during the autonomous mode of operation, the position server 140 is not utilized to compute the location of the mobile A-GPS device 110.

At step 214, the mobile A-GPS device 110 sends the current position to the cellular device 120. Specifically, the wireless transceiver 112 of the mobile A-GPS device 110 sends the position information to the wireless transceiver 122 of the cellular device 120 via a wireless ad hoc network (e.g., using BLUETOOTH). Thus, in this first embodiment, the mobile A-GPS device 110 can autonomously compute its position, as conventionally known in the art. Upon receiving a request for position information by a non location-enabled device, the computed position is sent via a wireless transmission to such non location-enabled cellular device.

At step 216, the cellular device 120 receives the current position from the mobile A-GPS device 110. At step 218, the cellular device 120 may optionally display the position information to the user of the cellular device 120. At step 220, the current position is sent from the cellular device 120 to the position server 140. In one embodiment, the current position is sent to the position server 140 via an SMS response message. At step 222, the position server 140 receives the current position information from the cellular device 120. At step 224, the position server 140 sends the position to the user terminal 160 via the Internet 154 in a conventionally known manner. Once the user terminal 160 has received the current position of the mobile A-GPS device 110, the method 200 ends at step 226.

For purposes of clarity by example, the method 200 has been described as processing a position request at the position server 140 by a third party. In another embodiment, the user of the cellular device 120 may be the position requester, rather than such a third party. In such an embodiment, the position server 140 is not required to participate in the method 200. The cellular device 120 may request and receive position information from the mobile A-GPS receiver 110 in response to a user request.

Figure 3:
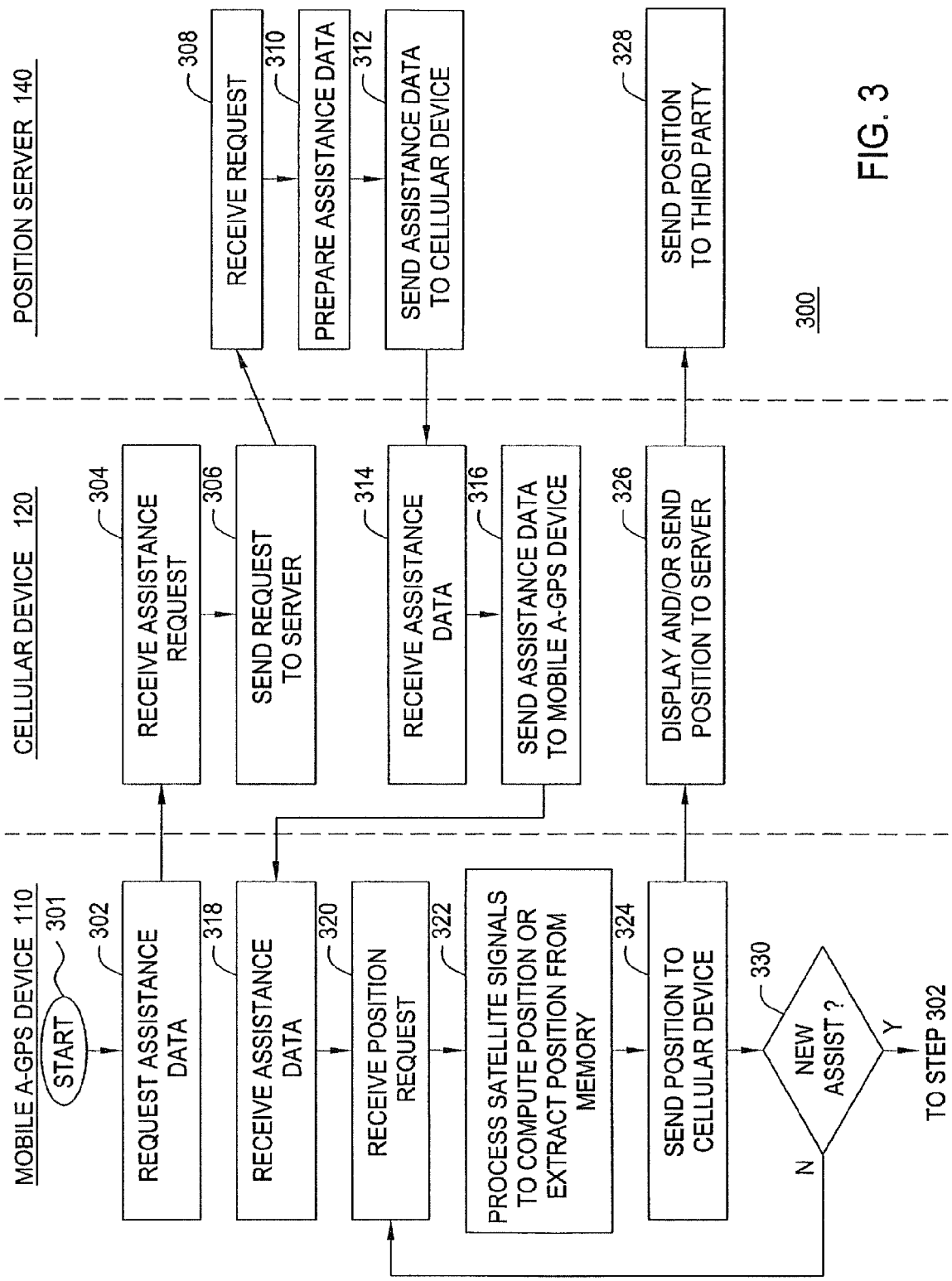
FIG. 3 is a flow diagram depicting another exemplary embodiment of a method for locating position of a mobile device in accordance with the invention.

FIG. 3 is a flow diagram depicting another exemplary embodiment of a method 300 for locating position of a mobile device. Aspects of the method 300 may be understood with simultaneous reference to FIG. 1. FIG. 3 is arranged in three columns, where the first column represents actions associated with the mobile A-GPS device 110, the second column represents actions associated with the cellular device 120, and the third column represents actions associated with the position server 140. In the present embodiment, the position location system 100 is configured in MS-Based mode in that the mobile A-GPS receiver 110 locates its own position using assistance data obtained from the position location server 140.

The method 300 begins at step 301. At step 302, the mobile A-GPS device 110 sends a request for assistance data to the cellular device 120 via a wireless ad hoc network. The assistance request may be sent using BLUETOOTH, although other wireless protocols may be used. At step 304, the assistance request is received at the cellular device 120. At step 306, the cellular device 120 sends the assistance request to the position server 140. The cellular device 120 may send the assistance request to the position server 140 using an SMS message, although other messaging techniques may be used.

At step 308, the position server 140 receives the assistance request. At step 310, the server 140 prepares the assistance data for the mobile A-GPS device 110. Notably, the server 140 prepares a satellite trajectory model for use by the mobile A-GPS device 110 over a predefined period of validity. For example, the assistance data may comprise ephemeris data that is valid for a period of four hours. Other types of satellite trajectory data may be used, as described above. At step 312, the position server 140 sends the assistance data to the cellular device 120. The assistance data may be sent using an SMS message, although other messaging techniques may be used.

At step 314, the cellular device 120 receives the assistance data. At step 316, the cellular device 120 sends the assistance data to the mobile A-GPS device 110. The assistance data may be sent using BLUETOOTH, although other wireless protocols may be used. At step 318, the mobile A-GPS device 110 receives the assistance data. The mobile A-GPS device 110 may use the assistance data for its associated validity period.

At step 320, the mobile A-GPS device 110 receives a position request. As discussed in the embodiments above, the position request may originate from the server 140 due to third party request, or may originate from the cellular device 120. In either case, at step 322, the mobile A-GPS device 110 may process satellite signals to compute position. Alternatively, the mobile A-GPS device 110 may periodically compute positions in-between position requests and thus may extract a recently computed position from memory. At step 324, the position is sent to the cellular device. At step 326, the cellular device 120 displays the position to the user and/or sends the position to the server 140. If the position is sent to the server 140, at step 328, the position may be forwarded to a third-party requester.

At step 330, a determination is made at to whether new assistance data is required. For example, the validity period of the assistance data may be expired. If so, the method 300 returns to step 302. Otherwise, the method 300 returns to step 320 and repeats for additional position requests. Thus, in the present embodiment, the mobile A-GPS device 110 is able to perform MS-based position computations by receiving assistance data from the position server 140 via the cellular device 120.

Figure 4:
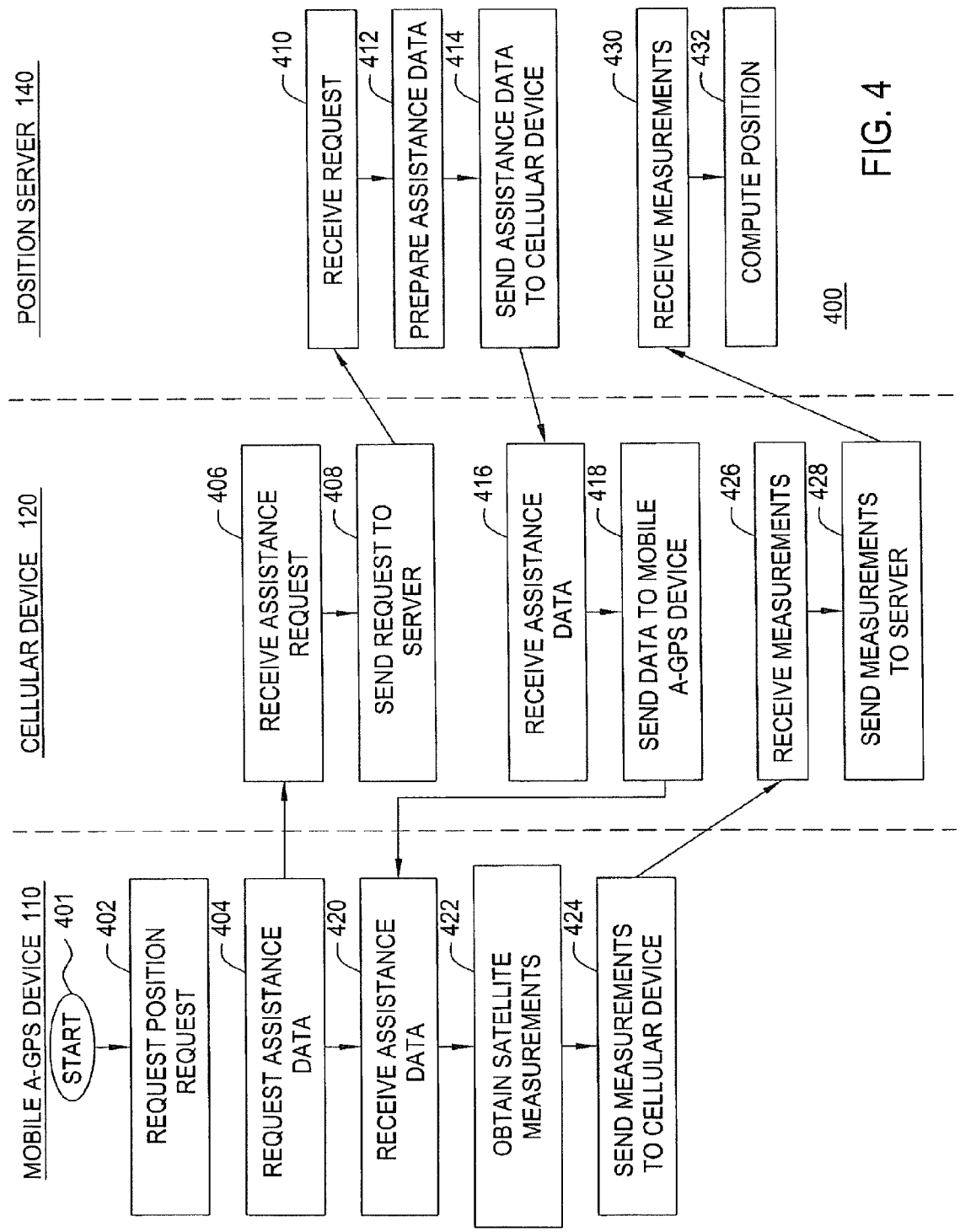
FIG. 4 is a flow diagram depicting yet another exemplary embodiment of a method for locating position of a mobile device in accordance with the invention.

FIG. 4 is a flow diagram depicting yet another exemplary embodiment of a method 400 for locating position of a mobile device in accordance with the invention. Aspects of the method 400 may be understood with simultaneous reference to FIG. 1. FIG. 4 is arranged in three columns, where the first column represents actions associated with the mobile A-GPS device 110, the second column represents actions associated with the cellular device 120, and the third column represents actions associated with the position server 140. In the present embodiment, the position location system 100 is configured in MS-Assisted mode in that the mobile A-GPS receiver 110 receives assistance data from the position location server 140 and sends satellite measurements to the position server 140 for the position computation.

The method 400 begins at step 401. At step 402, the mobile A-GPS device 110 receives a position request. As discussed in the embodiments above, the position request may originate from the server 140 due to third party request, or may originate from the cellular device 120. In either case, at step 404, the mobile A-GPS device 110 sends a request for assistance data to the cellular device 120. At step 406, the cellular device 120 receives the assistance request (e.g., via BLUETOOTH). At step 408, the cellular device 120 sends the assistance request to the server 140 (e.g., via an SMS message).

At step 410, the server 140 receives the assistance request. At step 412, the server 140 prepares assistance data for the mobile A-GPS device 110. Notably, the server 140 prepares acquisition assistance data for use by the mobile A-GPS device 110 in acquiring satellite signals. For example, the acquisition assistance data may comprise expected pseudorange data. Other types of acquisition assistance data may be used, as described above. At step 414, the position server 140 sends the assistance data to the cellular device 120 (e.g., via SMS message).

At step 416, the cellular device 120 receives the assistance data. At step 418, the cellular device sends the assistance data to the mobile A-GPS device 110 (e.g., via BLUETOOTH). At step 420, the mobile A-GPS device 110 receives the assistance data. At step 422, the mobile A-GPS device 110 obtains satellite measurements (e.g., pseudoranges) using the assistance data. At step 424, the mobile A-GPS device 110 sends the satellite measurements to the cellular device 120.

At step 426, the cellular device 120 receives the satellite measurements. At step 428, the cellular device 120 sends the satellite measurements to the position server 140. At step 430, the server 140 receives the satellite measurements. At step 432, the server 140 locates position of the mobile A-GPS device 110 using the satellite measurements. The position may be sent to the cellular device 120 or to a third-party user, as described in the embodiments above.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

What is claimed is:

1. A method for locating position, comprising:
   obtaining satellite measurement data from a plurality of satellites at a mobile device;
   obtaining assistance data; and
   receiving said position at a mobile-cellular device via a wireless ad hoc network; and
   wherein obtaining assistance data further comprises:
      transmitting, from said mobile device to said mobile-cellular device via said wireless ad hoc network, a request for assistance data;
      receiving assistance data at said mobile device from said mobile-cellular device via said wireless ad hoc network;

transmitting, from said mobile-cellular device to said server via a cellular network, said request for assistance data; and
receiving said assistance data at said mobile-cellular device from said server via said cellular network; and
wherein obtaining assistance data is responsive to receiving a request for said position at said mobile device from said mobile cellular device.

2. The method of claim 1, wherein said wireless ad hoc network comprises a BLUETOOTH communication link.

3. The method of claim 1, further comprising:
receiving said request at said cellular device from a position server via a cellular network for said position at said mobile device.

4. The method of claim 3, wherein said request is transmitted between said position server and said cellular device using a short message service (SMS) protocol.

5. The method of claim 3, further comprising:
sending, in response to said request, said position to said position server via a cellular network.

6. The method of claim 5, further comprising:
sending said position from said position server to a user terminal via a packet switched network.

7. The method of claim 1, further comprising:
receiving assistance data at said mobile device from said cellular device via said wireless ad hoc network;wherein said position is computed in response to said assistance data.

8. The method of claim 7, wherein said assistance data comprises satellite trajectory data.

9. The method of claim 7, further comprising:
receiving said assistance data at said cellular device from a position server via a cellular network.

10. The method of claim 9, wherein said assistance data is transmitted between said position server and said cellular device using a short message service (SMS) protocol.

11. A method for locating position, comprising:
obtaining satellite measurement data from a plurality of satellites at a mobile device;
obtaining assistance data;
sending said satellite measurement data from said mobile device to a cellular device via a wireless ad hoc network;
sending said satellite measurement data from said mobile-cellular device to a position server via a cellular network; and
receiving position of said mobile device in response to said satellite measurement data; and
wherein obtaining assistance data further comprises:
transmitting, from said mobile device to said mobile-cellular device via said wireless ad hoc network, a request for assistance data;
receiving assistance data at said mobile device from said mobile-cellular device via said wireless ad hoc network;
transmitting, from said mobile-cellular device to said server via said a cellular network, said request for assistance data; and
receiving said assistance data at said mobile-cellular device from said server via said cellular network; and
wherein obtaining assistance data is responsive to receiving a request for said position at said mobile device from said mobile cellular device.

12. The method of claim 11, wherein said wireless ad hoc network comprises a BLUETOOTH communication link.

13. The method of claim 11, wherein said satellite measurement data is transmitted from said cellular device to said position server using a short message service (SMS) protocol.

14. The method of claim 11, further comprising:
receiving said request at said cellular device from said position server via said cellular network for said position at said mobile device.

15. The method of claim 14, wherein said request is transmitted between said position server and said cellular device using a short message service (SMS) protocol.

16. The method of claim 11, further comprising:
receiving acquisition assistance data at said mobile device from said cellular device via said wireless ad hoc network;wherein said satellite measurement data is obtained in response to said assistance data.

17. The method of claim 16, wherein said acquisition assistance data comprises expected pseudorange data.

18. The method of claim 16, further comprising:
receiving said acquisition assistance data at said cellular device from said position server via said cellular network.

19. The method of claim 18, wherein said assistance data is transmitted between said position server and said cellular device using a short message service (SMS) protocol.

20. A mobile position system, comprising:
a mobile global positioning system (GPS) device comprising:
a GPS receiver for receiving satellite measurement data; and
a first wireless transceiver; and
a mobile cellular device without location-enabling capabilities comprising:
a second wireless transceiver for receiving location information from said GPS receiver via a wireless ad hoc network formed with said first wireless transceiver; and
wherein the mobile position system obtains assistance data, obtaining assistance data further comprising:
transmitting, from said mobile device to said mobile-cellular device via said wireless ad hoc network, a request for assistance data;
receiving assistance data at said mobile device from said mobile-cellular device via said wireless ad hoc network;
transmitting, from said mobile-cellular device to said server via a cellular network, said request for assistance data; and
receiving said assistance data at said mobile-cellular device from said server via said cellular network; and
wherein obtaining assistance data is responsive to receiving a request for said position at said mobile device from said mobile cellular device.

21. The mobile position system of claim 20, wherein the mobile GPS device is comprises an adaptor for receiving power from an automotive vehicle.

22. The mobile position system of claim 20, wherein the mobile GPS device is comprises an adaptor for receiving power from a cigarette lighter of an automotive vehicle.

23. The mobile position system of claim 20, wherein the mobile cellular device is a mobile cellular telephone.

24. The mobile position system of claim 20, wherein each of said first wireless transceiver and said second wireless transceiver comprises a BLUETOOTH transceiver.

* * * * *